W. R. DEGENHARDT & W. JORDAN.
APPARATUS FOR GENERATING OR PRODUCING GAS.
APPLICATION FILED NOV. 14, 1913.

1,133,010.

Patented Mar. 23, 1915.
3 SHEETS—SHEET 1.

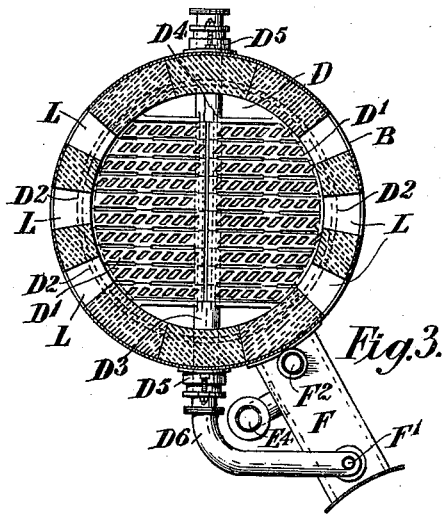
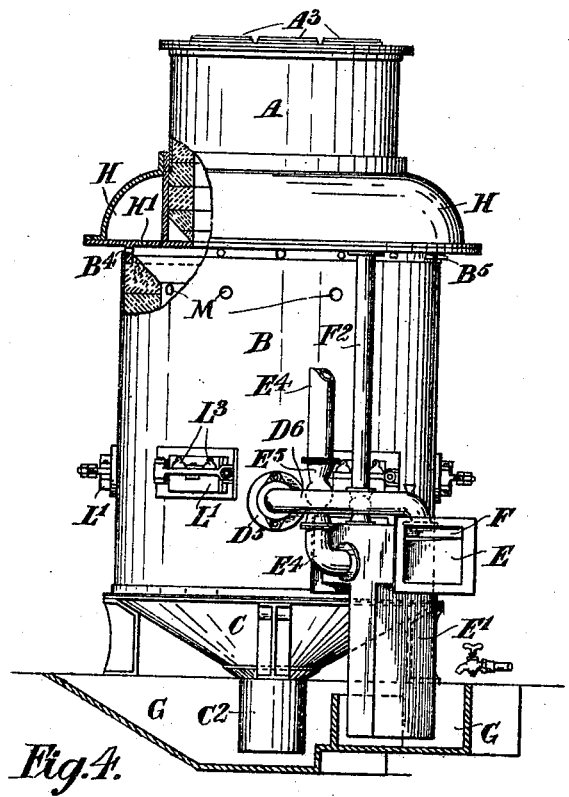

W. R. DEGENHARDT & W. JORDAN.
APPARATUS FOR GENERATING OR PRODUCING GAS.
APPLICATION FILED NOV. 14, 1913.

1,133,010.

Patented Mar. 23, 1915.
3 SHEETS—SHEET 3.

WITNESSES:
H. Hogg.
G. Lowe.

INVENTORS:
William Russell Degenhardt,
William Jordan,
BY Carl P. Goepel
ATTORNEY.

UNITED STATES PATENT OFFICE.

WILLIAM RUSSELL DEGENHARDT, OF KALGOORLIE, AND WILLIAM JORDAN, OF YOUANME, WESTERN AUSTRALIA, AUSTRALIA.

APPARATUS FOR GENERATING OR PRODUCING GAS.

1,133,010. Specification of Letters Patent. Patented Mar. 23, 1915.

Application filed November 14, 1913. Serial No. 800,985.

*To all whom it may concern:*

Be it known that we, WILLIAM RUSSELL DEGENHARDT and WILLIAM JORDAN, subjects of the King of Great Britain and Ireland, and residents, respectively, of 28 George street, Kalgoorlie, and Youanme, both in the State of Western Australia, Commonwealth of Australia, have invented certain new and useful Improvements in Apparatus for Generating or Producing Gas, of which the following is a specification.

This invention relates to certain improvements in apparatus for generating or producing gas and refers more particularly to a suction gas generator or producer for use in conjunction with gas engines or internal combustion motors.

The object of this invention is to provide an improved down draft gas generator or producer in which continuous running is insured for long periods without the need of discontinuing the operation thereof for the removal of the spent fuel and ashes or other refuse, and without the use of secondary air cocks or the like.

We accomplish this object by providing a suction gas generator or producer which comprises a fuel chamber, a combustion chamber and a gas chamber, a special form of fire grate arranged within the bottom of the combustion chamber, a central hollow support for the inner end of the fire bars connected to a novel form of flash vaporizer mounted on a seal pot for supplying superheated steam to the intake of the combustion or generating chamber below the fuel chamber. Openings are provided in the casing of the generating or combustion chamber fitted with doors having poking holes by means of which the fuel may be sliced and the spent fuel, ashes and clinkers, stirred and removed if necessary through the said doors, while the generator is working and also to enable the fire bars to be raised or lowered when desired, while the said fire bars are so constructed and supported that they can be readily raised and lowered without the ashes lodging under the same and setting them out of alinement.

The invention will be now more fully described aided by a reference to the accompanying sheets of drawings in which:—

Figure 1:
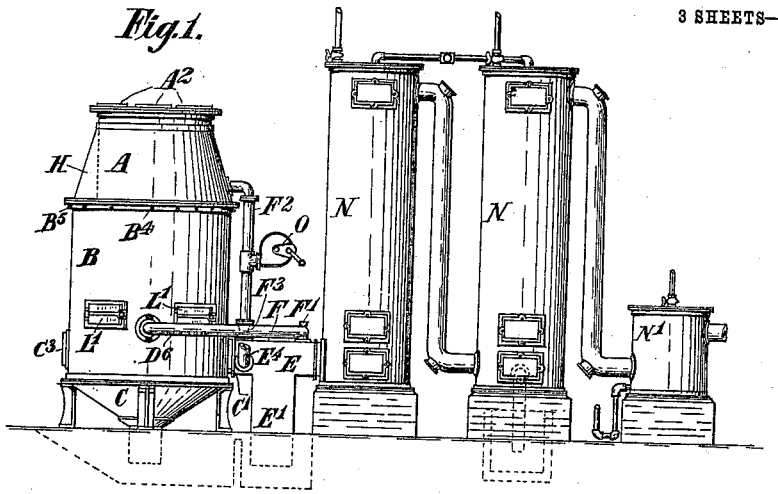
Figure 2:
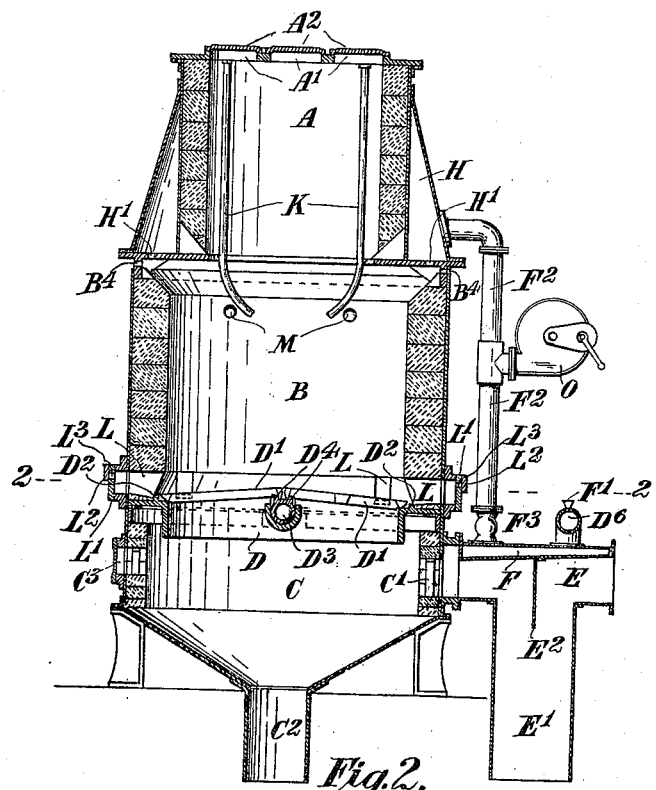
Figure 5:
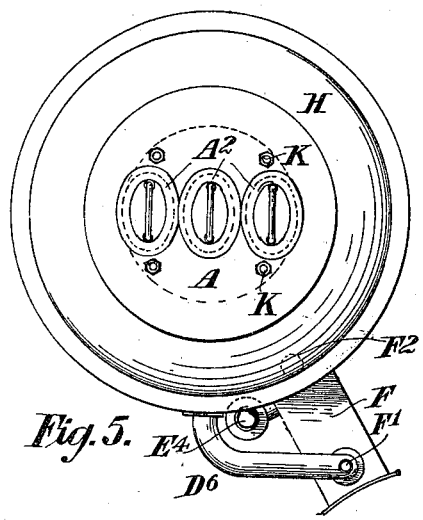
Figure 6:
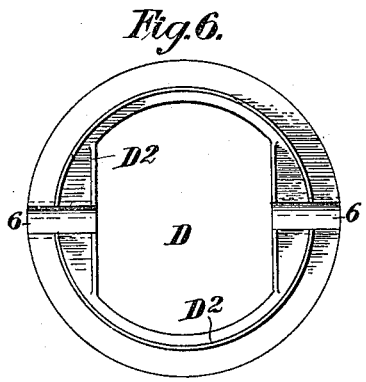

Figure 1 shows the general arrangement of a suction gas generator or producer plant, designed for use in conjunction with a gas engine or internal combustion motor and embodying this invention, the apparatus being shown connected to scrubbers and an expansion box or boxes from which the gas is drawn to the engine. Fig. 2 is a sectional elevation of the retort or generator which is constructed according to the invention and shown in Fig. 1. Fig. 3 is a section taken on line 2—2 of Fig. 2. Fig. 4 is a front elevation partly in section, and Fig. 5 a plan of the retort or generator showing a modified form of air and steam distributing chamber. Fig. 6 is a plan of the fire grate with the fire bars removed and Fig. 7 is a sectional longitudinal section on line 6—6 of Fig. 6 with the central hollow bearer in position.

In the accompanying sheets of drawings which illustrate a gas generating apparatus constructed according to this invention A is the fuel charging chamber, B the generating or combustion chamber, C the gas chamber, and C′ the gas discharge tube, leading to the scrubbers N and thence to the expansion box N′ before passing to the motor.

According to this invention the generator or producer is constructed of cylindrical form as shown, the chambers A, B and C being arranged one above the other and lined with suitable fire bricks or other suitable non-combustible material. The fuel charging chamber A is furnished at its top with fuel feed openings A′ fitted with removable covers $A^2$ while in the bottom of the generating chamber B is fitted the fire grate D having fire bars D′, below which is the gas chamber C furnished with a refuse discharge $C^2$ dipping into the water lute G, and an ash door $C^3$ fitted to the side of the chamber C.

Figure 7:
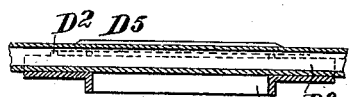

The fire grate frame D is constructed as shown in Figs. 6 and 7, having a central opening therein somewhat in the form of an ellipse in order to lessen the liability of the frame cracking, due to the intense heat, and also to permit of a larger grate area. An annular flange or rib $D^2$ is formed on the grate D which supports the fire brick lining. At a central position in each side of the said fire grate D is mounted the hollow bearer $D^3$ designed to support the inner end of the fire bars D′ which rest upon longitudinal ribs $D^4$ formed thereon. Each end of these fire bars D′ is so constructed that it is impossible for ashes or the like to lodge under the same and put them out of alinement. The outer ends of the said fire bars D′ are supported on the grate frame D inside the aforesaid annular flange or rib D² as shown in Fig. 2.

The hollow bearer D³ passes through the casing of the chamber B and at each end is supported in a suitable stuffing box or gland D⁵ in order to allow for expansion or contraction. One end of this hollow bearer D³ is open to atmosphere while its other end is connected by the pipe D⁶ to the vaporizer F, thus allowing a continuous current of air to be drawn through the bearer D³ for cooling the same, and also for supplying heated air to the vaporizer F.

The seal pot E is arranged at the side of the apparatus and is constructed somewhat T shaped as shown in Figs. 1, 2, 3 and 4, one end of the same being connected to the gas discharge tube C′ and its other end is connected through the scrubbers N and expansion box N′ to the suction pipe of the gas engine or internal combustion motor (not shown) while the vertically arranged portion E′ of the seal pot E is adapted to dip into the water lute, G. A baffle plate or deflector E² is mounted in the top portion of the seal pot E to intercept the gas from the chamber C to enable any ash or other like substance to be collected in the water lute G in which the water is maintained at a certain level.

The flash vaporizer F is formed on the top of the seal pot E as shown and as before stated is connected by the pipe D⁶ to the hollow bearer D³. A continuous water supply is fed to the vaporizer through the funnel F′ mounted on the pipe D⁶ in order to produce superheated steam for distribution inside the upper portion of the combustion chamber B.

The superheated steam and heated air is drawn from the vaporizer F to an annular chamber or reservoir H mounted on the top of the generating chamber, by the pipe F² as shown in Figs. 1, 2 and 4, and from thence the heated air and superheated steam is drawn into the generating chamber B through a series of holes H′ formed in the top of the same, enabling the superheated steam to be evenly distributed about the chamber B. The delivery pipe F² is furnished with the necessary regulating valve F³, while on the said seal pot E is mounted a vent pipe E⁴, and cock E⁵.

A series of vertically arranged pipes K are supported by the top of the chamber A and extend downwardly through the said chamber A into the chamber B and are adapted to permit atmospheric air to be drawn into the chamber B. About the top portion of the said generating chamber B is a series of holes B⁴ fitted with removable plugs B⁵. These holes enable ash and refuse to be scraped off the top of the brick lining of the chamber B and are also adapted to admit atmospheric air to the said chamber by removing the plugs in order to regulate the combustion of the fuel as desired. When lighting the fire in the chamber B it is necessary to create a draft therein and for this purpose a suitable fan or blower O is mounted on or connected to the air delivery pipe F². Or in place of the fan O compressed air may be forced into the said pipe F².

At each side of the chamber B and at a position slightly above the fire grate D are openings L (preferably three upon each side) fitted with removable doors L′. These openings L are adapted to enable the spent fuel and ashes or other refuse to be cleaned and sliced or removed as desired. These doors L′ are also furnished with poking holes L² over which are arranged suitable swinging covers L³ thus enabling the poking bars to be inserted in order to poke or stir the fire without having to open the door L′.

The fire bars D′ are so supported in the fire grate D that their ends are capable of being raised and lowered by means of a bar passed through the poke holes L² or through the openings L and then replaced in their proper position without fear of obstruction by ashes.

About the upper portion of the generating chamber B are four or more sight openings M to ascertain how the burning of the fuel is progressing.

The cycle of operation is as follows:— The seal pot being connected upon one side by means of the scrubbers N and expansion box N′ to the suction of the engine, and upon the other side to the gas chamber C below the fire grate, the suction of the said engine causes air to be drawn through the hollow bearer D³ into the flash vaporizer F into which is fed a continuous water drip, thus producing superheated steam which together with heated air is drawn into the chamber H at the top of the generating or combustion chamber B. This heated air and superheated steam is drawn downward through the fuel in the combustion chamber B, and the resultant gases are drawn through the fire grate into the gas chamber C and thence through the scrubbers N and expansion box N′ to the internal combustion engine or motor. Any ashes or other foreign substance entering the gas chamber C or seal pot E is collected in the water lute G, while any tarry matter will be collected in the scrubbers N. In charging and starting the generator the top covers or doors A² and the slicing doors L′ are opened. A good fire is started on the fire grate, the draft being regulated by the opening and closing of the slicing doors L′. The waste gases escape from the seal F through its vent-pipe E⁴, the cock E⁵ being opened for this purpose. When the fire is well alight, fuel is added through the feed openings in the top of the chamber A, and as the fire works through, more fuel is added until the generating chamber B is full. When the combustion is well established, the openings before mentioned, including the holes $B^4$ in the generator B and the cock $E^5$ are closed, and the vent cocks on the scrubbers N and expansion boxes N' are opened. If desired, in order to blow up the fire the hand fan O, mounted on the pipe $F^2$ is operated, at first very gently, until the fire is well alight, and then the same is operated at a much greater speed to increase the draft. As soon as the engine starts running all the plugs $B^5$ are inserted in the holes $B^4$ on the top of the chamber B, and more fuel is fed to the chamber A to within about a foot from the top of the same. The water drip is then admitted into the flash vaporizer F through the funnel F' and pipe $D^6$, the quantity of water being regulated to suit the moisture in the fuel. Fresh fuel is added at intervals of about one hour and the fire poked by means of a suitable bar inserted through the holes $L^2$ in the doors L', the time of poking the fire being arranged so as not to clash with the time of adding the fuel. The fire bars are agitated once in about every four hours in order to allow ashes or the like to be deposited into the water lute G. This is carried out by suitable pinch bars being inserted through the holes $L^2$ in the doors L', and passed under the end of the fire bars in order to raise and lower the same. These pinch bars are then used for slicing the fire and distributing the incandescent fuel over the fire bars. Any clinkers or the like which have been drawn toward the openings L during the poking operation are removed by opening the doors $L^3$. Only one of these doors $L^3$ should be opened at a time, but we have found that one of them may be left open for a period of 3 or 4 minutes with impunity, while the engine or motor is working under a full load.

We claim:—

1. A gas generator or producer comprising in combination a generating chamber having a superimposed fuel chamber, a grate at the bottom, a gas chamber beneath the said grate, an annular air supply chamber arranged at the top of the said generating chamber and a vaporizer connected to the said annular air supply chamber substantially as described.

2. A gas generator or producer, comprising in combination a generating chamber having a superimposed fuel chamber, a grate at the bottom of said generating chamber, having fire-bars and a hollow bearer for said bars, an annular air-supply chamber arranged at the top of said generating chamber, and a water-drip vaporizer for supplying superheated steam to the air-supply for the generator, connected to said hollow bearer.

3. A gas generator or producer comprising in combination a generating chamber having a superimposed fuel chamber, a grate at the bottom, a gas chamber beneath the said grate, an annular air supply chamber arranged at the top of the said generating chamber, the top of said generating chamber being provided with a plurality of openings communicating with said annular air-supply chamber, and a vaporizer connected to the said annular air supply chamber substantially as described.

4. A gas generator or producer comprising in combination a generating chamber having a superimposed fuel chamber, a grate at the bottom, a gas chamber beneath the said grate, an annular air supply chamber arranged at the top of the said generating chamber, and a vaporizer connected to the said annular air supply chamber, said generating chamber having openings in its wall, and covers for said openings, and said covers having openings therein for the insertion of poking rods, substantially as described.

5. A gas generator or producer comprising the combination of a fuel chamber A having feed openings with covers, a generating chamber B, having openings in the sides thereof provided with covers having holes for poking rods and openings $B^4$ formed in the side of the chamber casing and fitted with removable plugs for the admission of air, a gas chamber C, a grate D, having a central hollow bearer $D^3$ for the fire bars, a seal pot E, an annular air supply chamber H arranged at the top of the generator having air inlets arranged around the same, and a vaporizer F, connected to the said hollow-bearer and annular air supply chamber, all substantially as described and as shown in the drawings.

In testimony whereof we affix our signatures in presence of two witnesses.

WILLIAM RUSSELL DEGENHARDT.
WILLIAM JORDAN.

Witnesses:
NORBUT KEENAN,
G. S. JOHNSTONE.